C. BEHLEN.
RUNNING-GEAR FOR VEHICLES.
No. 169,616. Patented Nov. 9, 1875.
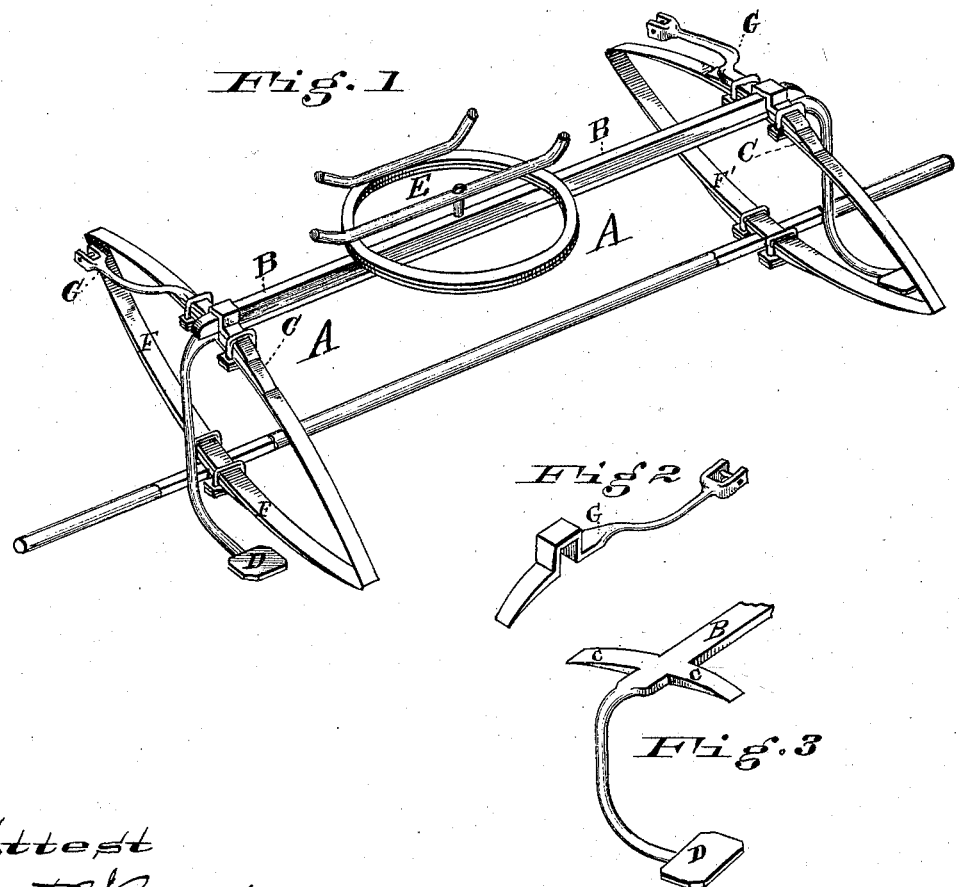
Attest
J. O. Kennedy
O. N. Dressel
Inventor
Charles Behlen
per Wm. Hubbell Fisher,
his Atty in fact.

UNITED STATES PATENT OFFICE.

CHARLES BEHLEN, OF CINCINNATI, OHIO.

IMPROVEMENT IN RUNNING-GEARS FOR VEHICLES.

Specification forming part of Letters Patent No. 169,616, dated November 9, 1875; application filed May 1, 1875.

*To all whom it may concern:*

Be it known that I, CHARLES BEHLEN, a resident of the city of Cincinnati and State of Ohio, have invented certain new and useful Improvements in Road-Vehicles, of which the following is a specification:

My invention consists in forming on each end of the supporting-bar of the fifth-wheel of vehicles a step, thereby obviating the necessity of using bolts or other means of attachment, requisite when the step is constructed in a separate piece. It also adds to the finish and appearance of the vehicle.

In the accompanying drawing, forming part of this specification, Figure 1 represents, in perspective, the frame of the running-gears of a road-vehicle embodying my improvements. Fig. 2 represents the shaft-coupling. Fig. 3 represents a portion of the supporting-bar, showing my improvements in detail.

A represents the frame. B is the supporting-bar of the fifth-wheel, having formed on its ends a cross-piece or web, C, which rests on top of the spring. D is the step, for the purpose of getting into and out of the vehicle, made in one piece with the supporting-bar and web. E is the fifth-wheel, of the usual style. F F' are the springs, on top of which rest the webs C of the supporting-bar B. G is the shaft-coupling, fastened on top of supporting-bar B by any suitable means, From its novel position the draft is downward, and by reason thereof obviates any trouble in the action of the fifth-wheel which would be likely to occur when the coupling is attached below the bar and the draft is upward.

What I claim as new, and desire to secure by Letters Patent, is—

In a vehicle, the supporting-bar of the fifth-wheel, terminating in steps D, forming integral parts thereof, substantially as and for the purpose specified.

CH. BEHLEN.

Attest:
ADAM SCHRAFFENBERGER.
D. P. KENNEDY.